United States Patent [19]
Roberson

[11] Patent Number: 5,829,311
[45] Date of Patent: Nov. 3, 1998

[54] MOTORIZED TILT STEERING DEVICE

[76] Inventor: Jarried E. Roberson, 1200 Avondale, Norman, Okla. 73069

[21] Appl. No.: 689,878

[22] Filed: Aug. 15, 1996

[51] Int. Cl.[6] ...................................................... B62D 1/18
[52] U.S. Cl. ............................................. 74/493; 280/775
[58] Field of Search ................................ 74/493; 280/775

[56] References Cited

U.S. PATENT DOCUMENTS

| | | | |
|---|---|---|---|
| 4,503,504 | 3/1985 | Suzumura et al. | 74/493 X |
| 4,669,325 | 6/1987 | Nishikawa et al. | 74/493 X |
| 4,793,204 | 12/1988 | Kubasiak | 74/493 |
| 5,646,385 | 7/1997 | Bogovican et al. | 200/61.54 |

FOREIGN PATENT DOCUMENTS

| | | | |
|---|---|---|---|
| 3618266 | 10/1987 | Germany | 74/493 |
| 0191668 | 11/1983 | Japan | 74/493 |

*Primary Examiner*—Rodney H. Bonck
*Assistant Examiner*—William C Joyce

[57] ABSTRACT

A motorized tilt steering device for modifying an existing manual steering column into a motorized tilting steering column which is controlled by a switch while maintaining the factory appearance. The device includes a hollow cylinder pivotally mounted to an existing steering column support, a steering wheel rotatably secured to the end of the hollow cylinder opposite of the existing steering column support, and a motorized tilting means which is mechanically connected to the hollow cylinder to tilt the hollow cylinder to the desired angle by the control of a switch mounted to the side of the hollow cylinder.

20 Claims, 3 Drawing Sheets

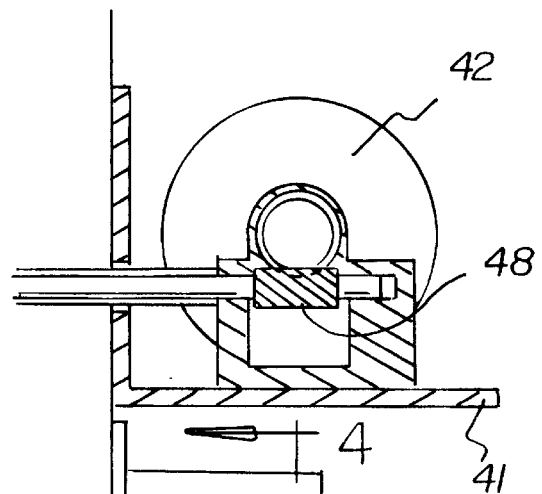
FIG 3
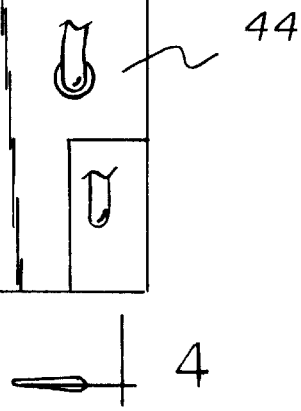
FIG 4
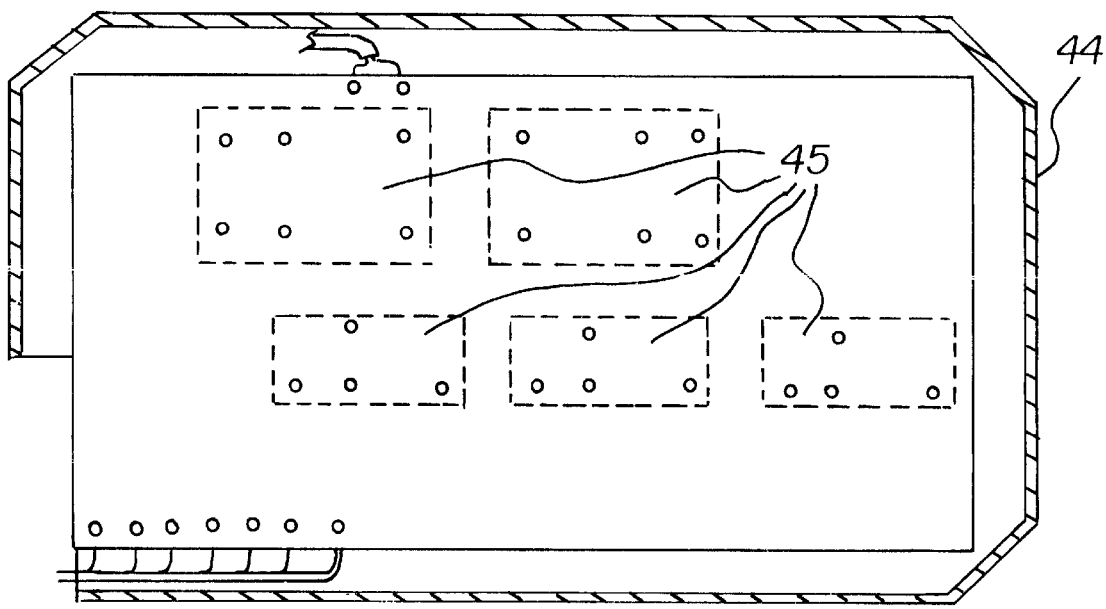

MOTORIZED TILT STEERING DEVICE

BACKGROUND OF THE INVENTION

1. Field of the Invention

The present invention relates to Tilt Steering Devices and more particularly pertains to a new Motorized Tilt Steering Device for modifying an existing manual steering column into a motorized tilting steering column which is controlled by a switch while maintaining the factory appearance.

2. Description of the Prior Art

The use of Tilt Steering Devices is known in the prior art. More specifically, Tilt Steering Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Tilt Steering Devices include U.S. Pat. No. 4,967,618; U.S. Pat. No. 5,048,364; U.S. Pat. No. 4,893,518; U.S. Pat. No. 4,900,059; U.S. Pat. No. 4,752,085 and U.S. Pat. No. 4,527,444.

While these devices fulfill their respective, particular objectives and requirements, the aforementioned patents do not disclose a new Motorized Tilt Steering Device. The inventive device includes a hollow cylinder pivotally mounted to an existing steering column support, a steering wheel rotatably secured to the end of the hollow cylinder opposite of the existing steering column support, and a motorized tilting means which is mechanically connected to the hollow cylinder thereby tilting the hollow cylinder to the desired angle by the control of a switch mounted to the side of the hollow cylinder.

In these respects, the Motorized Tilt Steering Device according to the present invention substantially departs from the conventional concepts and designs of the prior art, and in so doing provides an apparatus primarily developed for the purpose of modifying an existing manual steering column into a motorized tilting steering column which is controlled by a switch while maintaining the factory appearance.

SUMMARY OF THE INVENTION

In view of the foregoing disadvantages inherent in the known types of Tilt Steering Devices now present in the prior art, the present invention provides a new Motorized Tilt Steering Device construction wherein the same can be utilized for modifying an existing manual steering column into a motorized tilting steering column which is controlled by a switch while maintaining the factory appearance.

The general purpose of the present invention, which will be described subsequently in greater detail, is to provide a new Motorized Tilt Steering Device apparatus and method which has many of the advantages of the Tilt Steering Devices mentioned heretofore and many novel features that result in a new Motorized Tilt Steering Device which is not anticipated, rendered obvious, suggested, or even implied by any of the prior art Tilt Steering Devices, either alone or in any combination thereof.

To attain this, the present invention generally comprises a hollow cylinder pivotally mounted to an existing steering column support, a steering wheel rotatably secured to the end of the hollow cylinder opposite of the existing steering column support, and a motorized tilting means which is mechanically connected to the hollow cylinder thereby tilting the hollow cylinder to the desired angle by the control of a switch mounted to the side of the hollow cylinder.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Motorized Tilt Steering Device apparatus and method which has many of the advantages of the Tilt Steering Devices mentioned heretofore and many novel features that result in a new Motorized Tilt Steering Device which is not anticipated, rendered obvious, suggested, or even implied by any of the prior art Tilt Steering Devices, either alone or in any combination thereof.

It is another object of the present invention to provide a new Motorized Tilt Steering Device which may be easily and efficiently manufactured and marketed.

It is a further object of the present invention to provide a new Motorized Tilt Steering Device which is of a durable and reliable construction.

An even further object of the present invention is to provide a new Motorized Tilt Steering Device which is susceptible of a low cost of manufacture with regard to both materials and labor, and which accordingly is then susceptible of low prices of sale to the consuming public, thereby making such Motorized Tilt Steering Device economically available to the buying public.

Still yet another object of the present invention is to provide a new Motorized Tilt Steering Device which provides in the apparatuses and methods of the prior art some of the advantages thereof, while simultaneously overcoming some of the disadvantages normally associated therewith.

Still another object of the present invention is to provide a new Motorized Tilt Steering Device for modifying an existing manual steering column into a motorized tilting steering column which is controlled by a switch while maintaining the factory appearance.

Yet another object of the present invention is to provide a new Motorized Tilt Steering Device which includes a hollow cylinder pivotally mounted to an existing steering column support, a steering wheel rotatably secured to the end of the hollow cylinder opposite of the existing steering column support, and a motorized tilting means which is mechanically connected to the hollow cylinder thereby tilting the hollow cylinder to the desired angle by the control of a switch mounted to the side of the hollow cylinder.

Still yet another object of the present invention is to provide a new Motorized Tilt Steering Device that transforms a manual six position tilting system into a motorized multi-position tilting system.

Even still another object of the present invention is to provide a new Motorized Tilt Steering Device that increases the visibility of the instrument panel because of the multiple positions that the invention capable of.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross sectional view taken along line 3—3 of FIG. 2.

FIG. 4 is a cross sectional view taken along line 4—4 of FIG. 3.

DESCRIPTION OF THE PREFERRED EMBODIMENT

Figure 1:
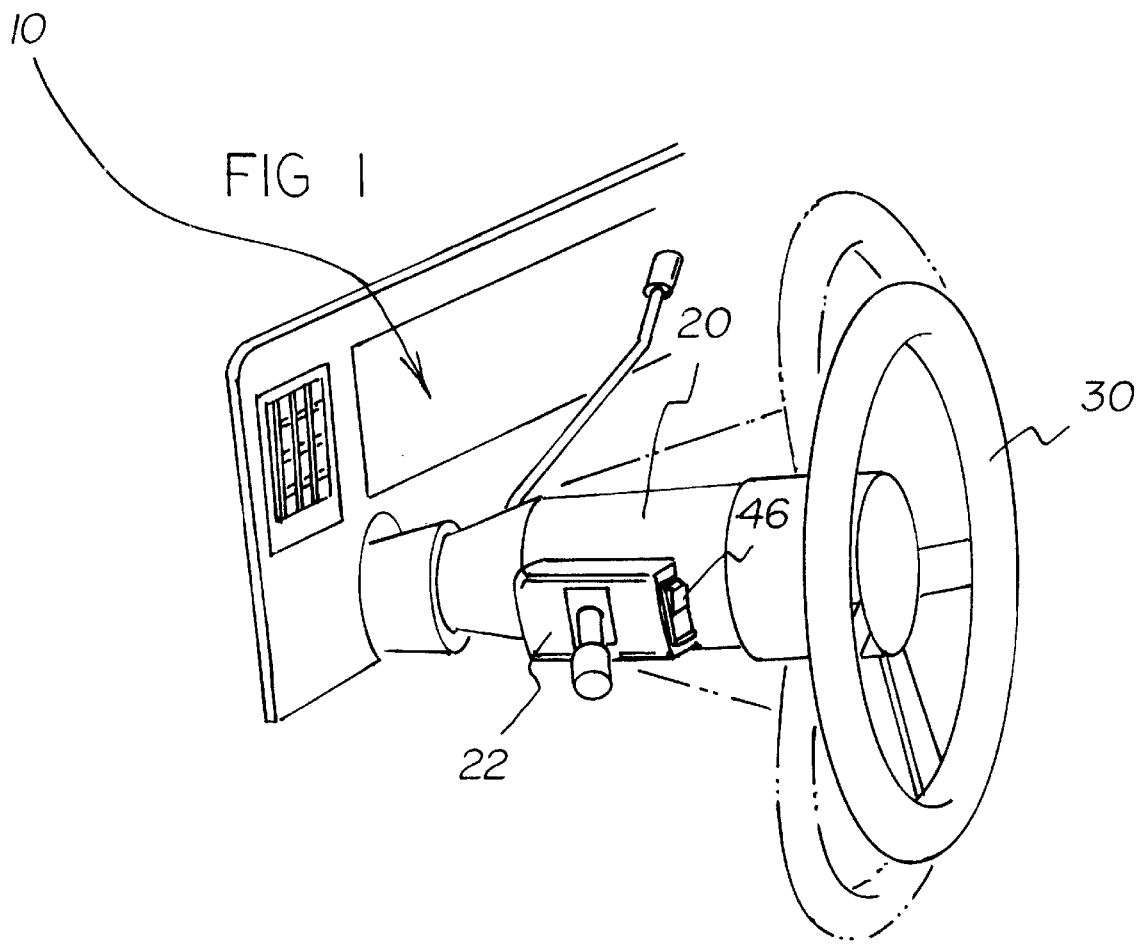
FIG. 1 is a left side perspective view of a new Motorized Tilt Steering Device according to the present invention.
Figure 2:
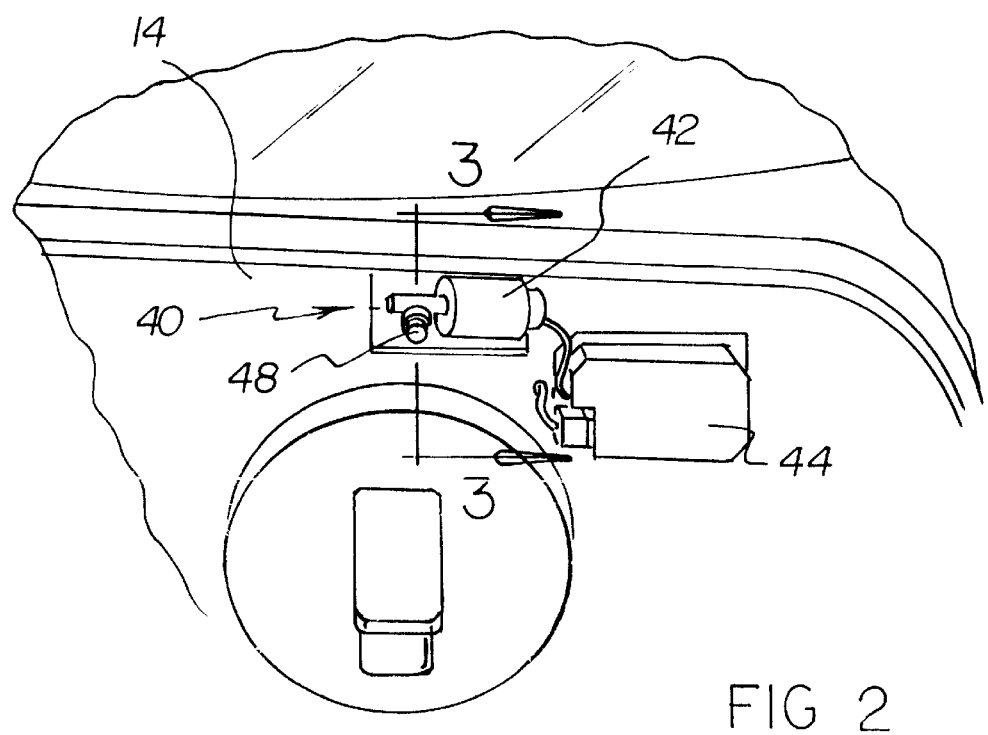
FIG. 2 is a rear view of the motorized tilting means.

With reference now to the drawings, and in particular to FIGS. 1 through 6 thereof, a new Motorized Tilt Steering Device embodying the principles and concepts of the present invention and generally designated by the reference numeral 10 will be described.

More specifically, it will be noted that the Motorized Tilt Steering Device 10 comprises a hollow cylinder 20 pivotally secured to an existing steering column support 12 of a vehicle, a steering wheel 30 rotatably secured to the end of the hollow cylinder 20 opposite of the existing steering column support 12, and a motorized tilting means 40 secured to the side of a firewall 14 near the engine compartment and mechanically pivoting the hollow cylinder 20.

Figure 5:
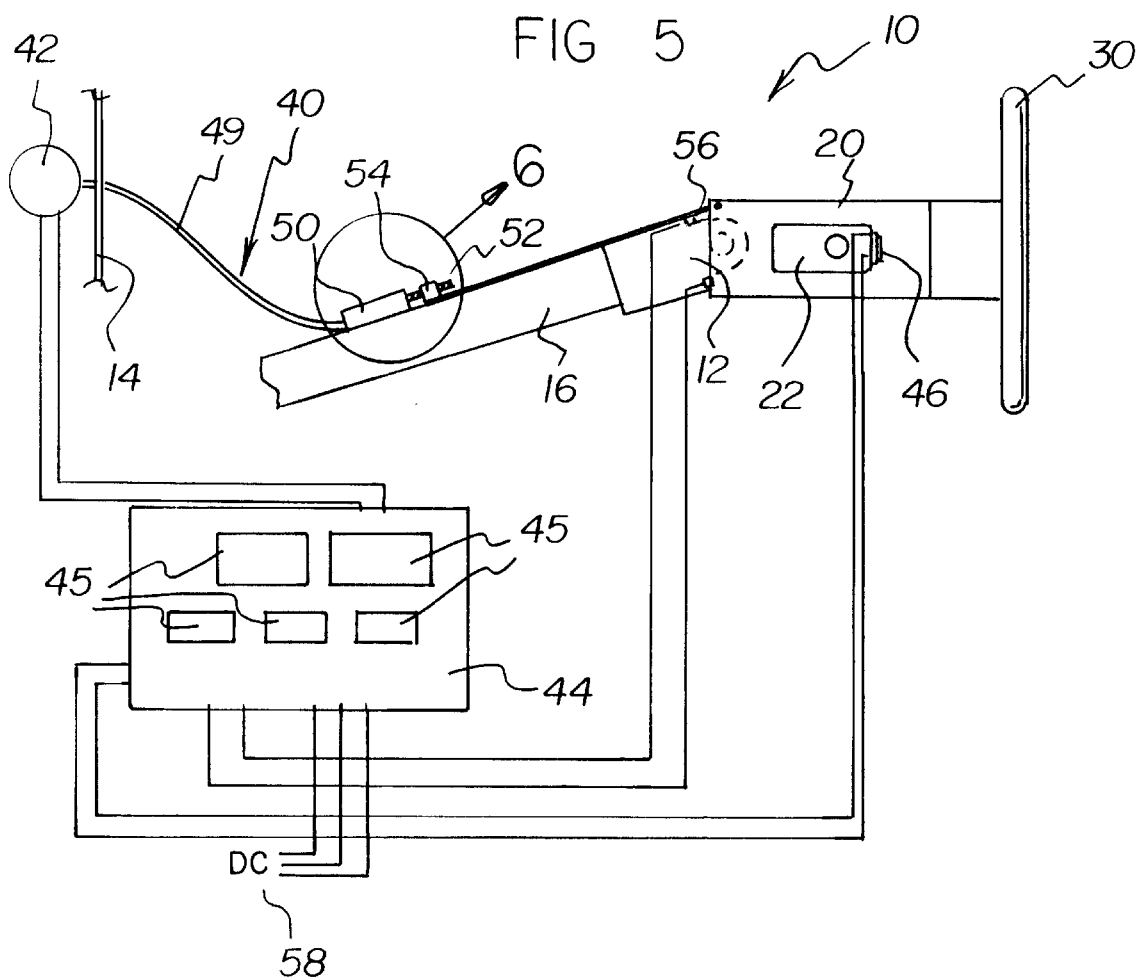
FIG. 5 is a left side view of the present invention.
Figure 6:
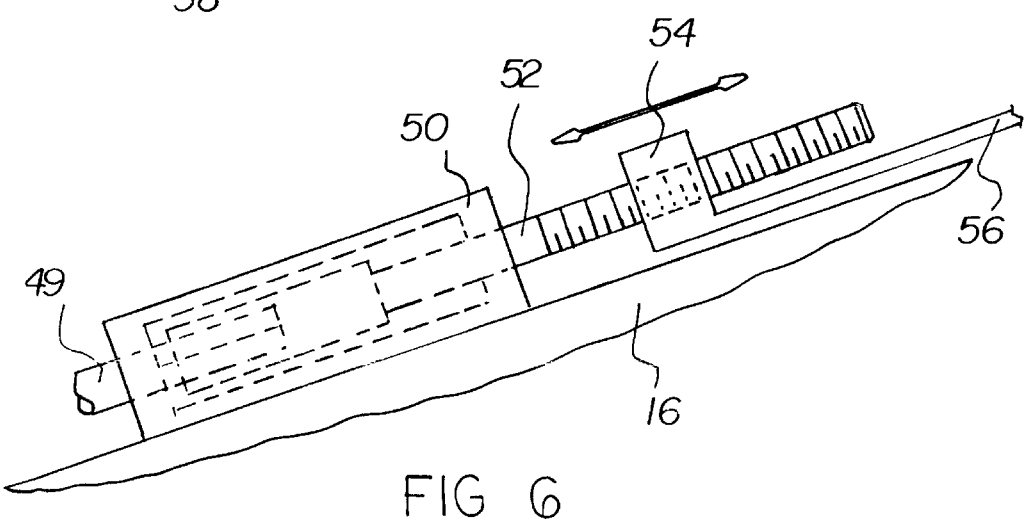
FIG. 6 is a magnified side view of the transducer from FIG. 5.

As best illustrated in FIGS. 1 and 5, it can be shown that the hollow cylinder 20 includes a switch 46 encasement 22 secured to the left side. A switch 46 is secured to the front surface of the switch 46 encasement 22 and electronically connected to a control box 44. The control box 44 includes a plurality of relays 45 electronically connected to and controlling an electric motor 42. An L-shaped support member 41 is secured to the side of the firewall 14 near the engine compartment and the electric motor 42 is secured to the horizontal portion as shown in FIG. 3 of the drawings. The electric motor 42 includes an unnumbered worm gear which engages a rotation converting axle 48 which converts the rotation of the electric motor 42 to an orthogonal direction as shown in FIG. 3 of the drawings. The rotation converting axle 48 secures an end of a rotating cable 49, where the opposite end of the rotating cable 49 engages a transducer 50 as shown in FIG. 5. The transducer 50 includes a threaded shaft 52 secured at one end to the end of the rotating cable 49 opposite of the rotation converting axle 48 as shown in FIG. 6 of the drawings. The rotating cable 49 rotates the threaded shaft 52. A threaded collar 54 surrounds the threaded shaft 52 thereby moving forward or backward along the threaded shaft 52 by the rotation of the threaded shaft 52. As shown in FIGS. 5 and 6, a drive rod 56 is secured to the bottom of the threaded collar 54 at one end and projects along a slanted support member 16 and the opposite end is secured to the cornice edge of the hollow cylinder 20 opposite of the steering wheel 30 thereby manipulating the angle of the hollow cylinder 20 in relation to the existing steering column support 12. The steering wheel 30 is preferably telescoping to allow manual horizontal adjustment. The control box 44 is electronically connected to a DC power source 58 of the vehicle.

In use, the user manipulates the switch 46 either up or down in relation to the vertical direction desired for the present invention. The switch 46 electronically controls the relays 45 within the control box 44, where the relays 45 electronically control the electric motor 42 in the proper rotational direction to achieve the desired vertical movement. When the user turns off the ignition, the control box 44 detects this and automatically raises the present invention without the user having to manipulate the switch 46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A motorized tilt steering device accessible to a user in a vehicle, the motorized tilt steering device comprising:

a hollow cylinder having an end pivotally secured to an existing steering column support of a vehicle;

a steering wheel having a hub portion rotatably secured to an end of the hollow cylinder opposite of the cylinder end pivotally secured to the existing steering column support;

a motorized tilting means for tilting the hollow cylinder, the tilting means being secured to the side of a firewall near the engine compartment, said motorized tilting means being adapted to mechanically tilt the hollow cylinder upward and downward in a substantially vertical plane;

a tilt control switch for actuating said motorized tilting means to tilt said hollow cylinder;

wherein the hollow cylinder includes a switch encasement secured to a side of the hollow cylinder between the ends thereof such that said switch does not interfere with the operation of an airbag mounted on the hub portion of the steering wheel.

2. The motorized tilt steering device of claim 1, wherein the switch encasement is adapted to have a surface facing the user of the vehicle; and a push-button switch is secured to the surface of the switch encasement facing the user of the vehicle, the switch further being electronically connected to a control box.

3. The motorized tilt steering device of claim 2, wherein the control box includes a plurality of relays electronically connected to an electric motor.

4. The motorized tilt steering device of claim 3, wherein an L-shaped support member is secured to the side of the firewall near the engine compartment and the electric motor is secured to a horizontal portion of the L-shaped member.

5. The motorized tilt steering device of claim 4, wherein the electric motor includes a worm gear which engages a rotation converting axle which converts the rotation of the electric motor.

6. The motorized tilt steering device of claim 5, wherein the rotation converting axle secures an end of a rotating cable, where the opposite end of the rotating cable engages a transducer.

7. The motorized tilt steering device of claim 6, wherein the transducer includes a threaded shaft secured at one end to the end of the rotating cable opposite of the rotation converting axle, where the rotating cable rotates the threaded shaft.

8. The motorized tilt steering device of claim 7, wherein a threaded collar surrounds the threaded shaft thereby moving forward or backward along the threaded shaft by the rotation of the threaded shaft.

9. The motorized tilt steering device of claim 8, wherein a drive rod is secured to the bottom of the threaded collar at one end and projects along a slanted support members; and wherein an opposite end of the drive rod is secured to an upper edge of the hollow cylinder opposite of the steering wheel thereby manipulating the angle of the hollow cylinder in relation to the existing steering column support.

10. The motorized tilt steering device of claim 9, wherein the control box is electronically connected to a DC power source of the vehicle.

11. A motorized tilt steering device accessible to a user in a vehicle, the motorized tilt steering device comprising:

a hollow cylinder pivotally secured to an existing steering column support of a vehicle;

a steering wheel adapted for being rotatably secured to an end of the hollow cylinder opposite an existing steering column support;

a motorized tilting means for tilting the hollow cylinder, the tilting means being secured to a side of a firewall proximate the engine compartment;

wherein the hollow cylinder includes a substantially rectangular switch encasement secured to a left side of the hollow cylinder, the switch encasement further having an opening adapted for permitting a stalk switch to extend therethrough.

12. The motorized tilt steering device of claim 11, wherein the switch encasement is adapted to have a surface facing the user of the vehicle; and a tilt control switch secured to the surface of the switch encasement in an orientation facing the steering wheel of the vehicle, the switch comprising a rocker switch having an upper button and a lower button, said upper button being adapted to cause said tilting means to tilt said steering wheel in an upward direction, said lower button being adapted to cause said tilting means to tilt said steering wheel in a downward direction.

13. The motorized tilt steering device of claim 12, additionally comprising a control box including a plurality of relays electronically connected to an electric motor which is adapted for tilting the hollow cylinder.

14. The motorized tilt steering device of claim 11, wherein an L-shaped support member is secured to the side of the firewall near the engine compartment and an electric motor is secured to a horizontal portion of the L-shaped member for moving said L-shaped support member.

15. The motorized tilt steering device of claim 14, additionally comprising a worm gear engaging a rotation converting axle for converting the rotation of the electric motor to linear motion.

16. The motorized tilt steering device of claim 15, wherein the rotation converting axle secures an end of a rotating cable, where the opposite end of the rotating cable engages a transducer.

17. The motorized tilt steering device of claim 16, wherein the transducer includes a threaded shaft secured at one end to the end of the rotating cable opposite of the rotation converting axle, where the rotating cable rotates the threaded shaft.

18. The motorized tilt steering device of claim 17, wherein a threaded collar surrounds the threaded shaft thereby moving forward or backward along the threaded shaft by the rotation of the threaded shaft.

19. The motorized tilt steering device of claim 18, wherein a drive rod is secured to the bottom of the threaded collar at one end and projects along a slanted support member;

wherein an opposite end of the drive rod is secured to an upper edge of the hollow cylinder opposite of the steering wheel thereby manipulating the angle of the hollow cylinder in relation to the existing steering column support; and wherein a control box for controlling said electric motor is electronically connected to a DC power source of the vehicle.

20. A motorized tilt steering device accessible to a user in a vehicle, the motorized tilt steering device comprising:

a hollow cylinder pivotally secured to an existing steering column support of a vehicle;

a steering wheel adapted for being rotatably secured to an end of the hollow cylinder opposite an existing steering column support;

a motorized tilting means for tilting the hollow cylinder, motorized tilting means comprising an electric motor, the tilting means being secured to a side of a firewall proximate the engine compartment;

wherein the hollow cylinder includes a substantially rectangular switch encasement secured to a left side of the hollow cylinder, the switch encasement further having an opening adapted for permitting a stalk switch to extend therethrough;

wherein the switch encasement is adapted to have a surface facing the user of the vehicle;

a tilt control switch secured to the surface of the switch encasement in an orientation facing the steering wheel of the vehicle, the switch comprising a rocker switch having an upper button and a lower button, said upper button being adapted to cause said tilting means to tilt said steering wheel in an upward direction, said lower button being adapted to cause said tilting means to tilt said steering wheel in a downward direction;

a control box for controlling said electric motor and including; a plurality of relays electronically connected to the electric motor;

wherein an L-shaped support member is secured to the side of the firewall near the engine compartment and an electric motor is secured to a horizontal portion of the L-shaped member for moving said L-shaped support member;

a worm gear engaging a rotation converting axle for converting the rotation of the electric motor to linear motion;

wherein the rotation converting axle secures an end of a rotating cable, where the opposite end of the rotating cable engages a transducer;

wherein the transducer includes a threaded shaft secured at one end to the end of the rotating cable opposite of the rotation converting axle, where the rotating cable rotates the threaded shaft;

wherein a threaded collar surrounds the threaded shaft thereby moving forward or backward along the threaded shaft by the rotation of the threaded shaft;

wherein a drive rod is secured to the bottom of the threaded collar at one end and projects along a slanted support member;

wherein an opposite end of the drive rod is secured to an upper edge of the hollow cylinder opposite of the steering wheel thereby manipulating the angle of the hollow cylinder in relation to the existing steering column support; and wherein the control box is electronically connected to a DC power source of the vehicle.

\* \* \* \* \*